United States Patent Office 3,240,592
Patented Mar. 15, 1966

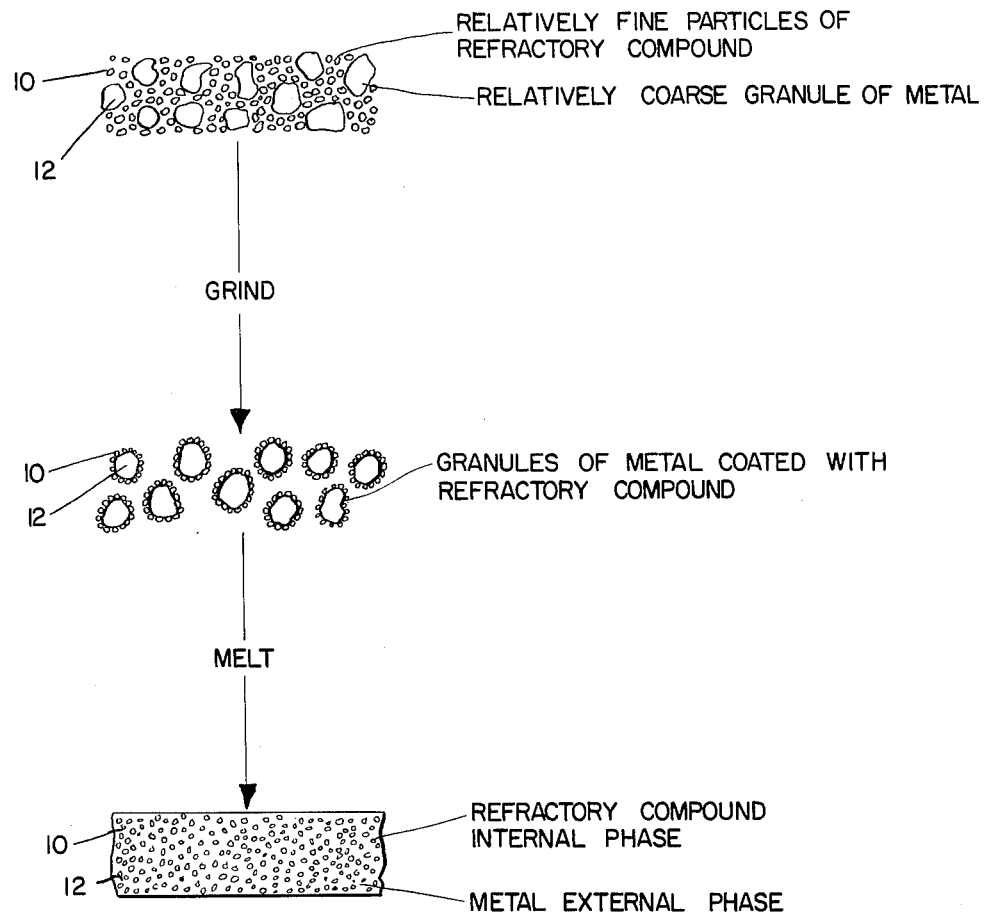

3,240,592
DISPERSION HARDENED MATERIALS AND PROCESSES THEREFOR
Robert S. Bray, Wayland, Mass., assignor, by mesne assignments, to Copper Range Company, New York, N.Y., a corporation of Michigan
Filed Apr. 16, 1962, Ser. No. 187,498
12 Claims. (Cl. 75—135)

The present invention relates to metallurgy and, more particularly, to materials and processes involving a metallic phase, often relatively soft, that provides a desired physical characteristic such as electrical conductivity, and another phase, insoluble in the metallic phase, that provides another desired physical characteristic such as resistance to softening. For example, the conductivity of a relatively soft copper material may be maintained while its resistance to softening is greatly increased when particles of a relatively hard compound are dispersed therein. Attempts to stir oxide particles into a copper melt have not been successful due to lack of uniformity of the dispersion in consequence of settling and due to difficulty in wetting the particles to be dispersed in consequence of the high surface tension of the melt.

Primary objects of the present invention are: to provide a high conductivity, high resistance to softening composition by selecting a high conductivity, relatively soft metal such as copper and a similar density, relatively hard compound such as a refractory material, mixing the two materials at an elevated temperature at which one material constitutes an external liquid phase and the other constitutes an internal liquid or solid phase, maintaining the uniformity of the dispersion during mixing by reason of the approximately uniform density, and cooling the system to provide a composite multiphase material having the desired combination of properties; and to ensure good preliminary wetting of the internal phase by mixing the two phases initially in such form that the hard compound is composed of relatively fine powder and the soft metal is composed of relatively coarse granules.

Other objects of the present invention will in part be obvious and will in part appear hereinafter.

The invention accordingly comprises the materials and processes involving the sequence and combination of steps and components which are exemplified in the following detailed disclosure, the scope of which will be indicated in the appended claims. For a fuller understanding of the nature and objects of the present invention, reference should be had to the following detailed description, taken in connection with the accompanying drawings wherein:

The figure shows exaggerated cross-sectional views of materials undergoing a process of the present invention.

Generally, the process illustrated herein as embodying the present invention involves the production of a composite material having an external phase of a relatively soft metal and an internal phase of a relatively hard compound, the external phase and the internal phase being substantially insoluble in each other and of approximately like density. Preferably, the external phase is a metal, particularly copper. Preferably, the internal phase is an oxide, carbide, boride, nitride, selenide, silicide or phosphide. For best results, the particle size of at least 90% by weight of the internal phase ranges from .01 to 50 microns. Initially the internal phase is mixed with the external phase in the form of granules at least 90% by weight ranging from .05 to .5 inch. The internal phase preferably ranges from .1 to 25% by total weight. Best results are obtained when the mixture is ground to intimately coat the particles of the internal phase on the granules of the external phase before fusing.

The following non-limiting examples will further illustrate the present invention.

Example 1

In the figure, particles 10 of molybdenum diboride of the order of 1 micron in extent and chips 12 of copper approximately ⅛ inch in extent were mixed as in (a) and ground together in a ball mill. By total weight, the ratio of the copper to molybdenum diboride was about 5 to 1. In consequence, the molybdenum diboride particles became imbedded as at (b) in the surface of the relatively soft copper. Melting of the copper was effected under a temperature of about 1250° C. under a protective atmosphere of an inert gas such as nitrogen or noble gas such as argon. After the composite material was cooled to room temperature, it was worked, for example rolled, in order to compress it about 45%. Although ordinarily copper starts to soften at about 400° F. and is fully soft by 570° F., the composite material here showed no substantial softening to 800° F. and was not yet fully soft by 950° F.

Example 2

The process of Example 1 was repeated except that molybdenum boride was substituted for molybdenum diboride. The results were similar to those of Example 1.

Example 3

The process of Example 2 was repeated except that molybdenum carbide was substituted for molybdenum diboride. The results were similar to those of Example 2.

The following tests further illustrate the results of Examples 1, 2 and 3 in terms of hardness and conductivity at various temperatures for various combinations of materials.

| Material | Conditions, ° F. | Hardness Rockwell F | Conductivity, percent original Cu |
|---|---|---|---|
| 1. Cu+MoB$_2$ | After compression and at room temperature. | 93 | 97 |
|  | 685 | 84 | 97 |
|  | 750 | 83 | 97 |
|  | 720 | 83 | 97 |
|  | 700 | 81 | 97 |
| 2. Cu+MoB$_2$ | After compression and at room temperature. | 85 | 97 |
|  | 600 | 85 | 97 |
|  | 650 | 85 | 97 |
|  | 700 | 75-80 | 97 |
| 3. Cu+MoB$_2$ | After compression and at room temperature. | 89 | 97 |
|  | 600 | 82 | 97 |
|  | 650 | 75-70 | 97 |
|  | 700 | 45-30 | 97 |
| 4. Cu+MoB | After compression and at room temperature. | 89 | 97.0 |
|  | 635 | 88 | 98.3 |
|  | 700 | 84 | 98.2 |
|  | 750 | 78 | 98.9 |
|  | 800 | 65-55 | 98.9 |
|  | 850 | 53-44 | 98.9 |
| 5. Cu+Mo$_2$C | After compression and at room temperature. | 83 | 97.0 |
|  | 635 | 87-81 | 97.5 |
|  | 700 | 82-76 | 97.5 |
|  | 750 | 81 | 98.4 |
|  | 800 | 79 | 98.5 |
|  | 850 | 70-43 | 98.9 |
| 6. Cu+Mo$_2$C | As cast and at room temperature. | 21 | 95.4 |
|  | After compression and at room temperature. | 90-83 | 96.0 |
|  | 700 | 86 | 97.7 |
|  | 750 | 87 | 97.9 |
|  | 830 | 70 | 98.1 |
|  | 850 | 73 | 98.9 |
|  | 900 | 60-34 | 98.8 |

| Material | Conditions, °F. | Hardness Rockwell F | Conductivity, percent original Cu |
|---|---|---|---|
| 7. Cu+MoB | As cast and at room temperature. | 23 | 97.2 |
|  | After compression and at room temperature. | 87 | 97.7 |
|  | 700 | 82 | 98.9 |
|  | 750 | 80 | 99.2 |
|  | 800 | 78-60 | 99.3 |
|  | 850 | 71-63 | 98.9 |
|  | 900 | 5-1 | 99.4 |
|  | 950 | 60-40 | 99.5 |
| 8. Cu+MoC₂ | As cast and at room temperature. | 18 | 95.3 |
|  | As compressed and at room temperature. | 88 | 96.2 |
|  | 635 | 87-81 | 97.5 |
|  | 700 | 82-76 | 97.6 |

Thus the illustrated embodiments of the present invention provide improved resistance to softening without appreciable sacrifice of conductivity, by means of a novel relationship of materials. Since certain changes may be made in the above disclosure without departing from the scope of the invention herein, it is intended that all matter described in the foregoing specification and illustrated drawings be interpreted in an illustrative and not in a limiting sense.

What is claimed is:

1. A composite material comprising at least two phases including a first phase containing copper and a second phase containing a compound, said first phase and said second phase being substantially uniformly interspersed, said second phase being in the form of particles generally ranging between .01 and 50 microns in extent, said second phase ranging from 0.1 to 25% by total weight, said copper being relatively soft and said compound being relatively hard, said copper and said compound being mutually insoluble, said second phase ranging from 0.1 to 25% by total weight of said composite material, said copper and said compound being approximately of like density, said compound containing a non-metal selected from the class consisting of oxides, carbides, borides, nitrides, selenides, silicides and phosphides.

2. The compoite material of claim 1 wherein said compound is molybdenum boride.

3. The composite material of claim 1 wherein said compound in molybdenum diboride.

4. The composite material of claim 1 wherein said compound is molybdenum carbide.

5. A process for producing a composite material comprising the steps of grinding together a mixture of granules of metal and a powder composed of a compound, said granules and said powder being uniformly interspersed, said metal and said compound being approximately equal in density, said metal and said compound being substantially mutually insoluble, said granules ranging substantially between 0.05 and 0.5 inch, the particles of said powder ranging substantially between 0.01 and 50 microns in maximum extent, said compound ranging between 0.1 and 25% by total weight, heating said mixture to a temperature above the melting point of said metal and below the melting point of said compound for a period necessary to fuse said granules, and cooling said mixture to room temperature in order to produce a product having substantially the electrical properties of said metal and mechanical properties including hardness greater than that of said metal, said metal being copper, said compound being selected from the class consisting of oxides, carbides, borides, nitrides, selenides, silicides and phosphides.

6. The process of claim 5 wherein said compound is molybdenum boride.

7. The process of claim 5 wherein said compound is moylbdenum diboride.

8. The process of claim 5 wherein said compound is molybdenum carbide.

9. The process comprising the steps of mixing a molybdenum compound in the form of a powder of granules of the order of 1 micron in extent and copper in the form of chips approximately ⅛ inch in extent, said granules and said chips being uniformly interpersed, the ratio of copper to molybdenum compound being about 5 to 1, milling the mixture in order to embed said molybdenum compound powder in said copper graules, melting said copper at a temperature of approximately 1250° C. under a protective atmosphere of an inert gas, cooling the resulting product, and rolling said product in order to compress it along a particular dimension substantially, said copper and said molybdenum compound being of substantially the same density and being mutually insoluble.

10. The process of claim 9 wherein said compound is a boride.

11. The process of claim 9 wherein said compound is a diboride.

12. The process of claim 9 wherein said compound is a carbide.

References Cited by the Examiner

UNITED STATES PATENTS

| | | | |
|---|---|---|---|
| 1,698,934 | 1/1929 | Chesterfield | 75—171 |
| 1,984,203 | 12/1934 | Sieger | 75—208 X |
| 2,049,449 | 8/1936 | Jennison | 75—154 X |
| 2,352,246 | 7/1944 | Benner et al. | 75—154 X |
| 2,580,171 | 12/1951 | Hagglund et al. | 75—126 |
| 3,028,234 | 4/1962 | Alexander et al. | 75—135 |

OTHER REFERENCES

Molybdenum: (Morthcott, Butterworth Scientific Publications, 1956, pp. 135–137.)

DAVID L. RECK, *Primary Examiner.*

BENJAMIN HENKIN, *Examiner.*